Patented Nov. 3, 1936

2,059,399

UNITED STATES PATENT OFFICE 2,059,399

PROCESS FOR STERILIZING AND DRYING EGGS

Henry I. Rosner, Brooklyn, N. Y., assignor to Joe Lowe Corporation, New York, N. Y., a corporation of Delaware No Drawing. Application November 23, 1935, Serial No. 51,273

20 Claims. (Cl. 99—210)

This invention relates to a process for drying egg albumen, and the present application is a continuation in part of my co-pending applications Serial No. 635,603, filed September 30, 1932, and Serial No. 727,275, filed May 24, 1934.

The term "egg albumen" as used herein applies to egg whites generally, but more particularly to the whites of eggs of the domestic fowl.

Various methods have heretofore been employed in drying egg albumen, as for example, by fermentation prior to drying. It has also been proposed to introduce sugar in the egg albumen to facilitate drying, but this introduces sugar in the dried product. Spraying the egg albumen has also been tried but without obtaining the desired result.

The object of this invention is a quick and inexpensive process of preparing egg albumen so that it can be dried without losing its desirable properties.

In accordance with this new process the separated egg albumen is first acidified to a suitable degree of acidity by the addition of an edible water soluble acid, and the mixture is thereafter allowed to stand and settle to allow the objectionable components, such as the chalazae and stringy portions of the egg whites, to separate from and rise to the surface of the mass from which they are removed in any suitable manner as by skimming. After all of the chalazae and stringy portions of the egg whites have been removed, the acidified egg albumen may be dried in any known way.

In some cases after the chalazae and stringy portions of the egg whites have been separated from and skimmed off the acidified egg albumen, the mass may be rendered alkaline by the addition of a suitable alkaline substance before drying.

In carrying out the process the egg albumen is first separated from the yolks and placed in a tank or vat of suitable capacity, a glass lined tank being well suited to the purpose intended. The fresh broken egg whites may be strained by passing through a screen of suitable mesh. A thirty-two mesh screen is suitable for this purpose. An edible water soluble acid, for example, lactic acid, is now gradually added to the tank containing the egg albumen. By adding the acid gradually, coagulation of the egg albumen is prevented; and by stirring the mass thoroughly while adding the acid, and noting the pH reading of the mixture to determine its degree of acidity, over-acidification of the egg albumen may be avoided. Satisfactory results can be obtained by adding sufficient acid to the egg albumen to give a reading of from pH 6 to pH 5. The mixture is now permitted to stand, preferably in a warm room, to allow the chalazae and stringy portions of the egg whites to separate out and rise to the surface in the form of a scum, which is now skimmed off. Skimming should be repeated as often as necessary, until all of the scum has been removed, leaving a clear solution at the bottom. The time required to effect complete separation varies with conditions between 4 and 36 hours. At the end of from 24 to 36 hours, all of the chalazae and stringy portions should have separated from the mixture. After removing the scum it may be allowed to stand and any clear liquid remaining in the scum drained off and returned to the vat containing the clear solution. It should be understood that the process is accelerated by increasing, and retarded by decreasing, the room temperature from normal. Where the temperature is increased to accelerate the consummation of the process, care must be taken not to employ a temperature high enough to adversely affect its proper operation. After the expiration of the settling and skimming period the clear solution containing the egg albumen thus treated, is ready for drying and is removed to the dryers where drying is accomplished in any known manner, and dried egg albumen is produced. If dried in pans flake albumen will be produced, while if dried by spraying in the presence of heat, the albumen will be in powdered form.

Other edible water soluble acids which may be substituted for lactic acid include acetic, tartaric, citric, malic, gluconic, hydrochloric and phosphoric. It should also be understood that a mixture of acids may be used instead of a single acid for example, a mixture of lactic and phosphoric acids may be mixed with the egg albumen sufficient to give a pH reading of approximately 5.2.

Albumen thus processed is of high quality, entirely free from objectionable odors, and may be kept indefinitely without deteriorating.

Where it is desired to neutralize the acidified egg albumen before drying, a soluble and non-toxic alkaline substance as for example, ammonium hydroxide ($NH_4OH$) is gradually added to the acidified mixture and the degree of alkalinity noted. When the degree of alkalinity reaches approximately pH 8.6 no further alkali need be added. The mass is preferably allowed to settle for a period of a few hours during which time any scum rising to the surface is skimmed off. Other soluble and non-toxic alkalis which may be substituted for ammonium hydroxide include those of the sodium, potassium and ammonium group, organically substituted ammonias, and ammonia derivatives, which are water soluble and non-toxic, and the carbonates of any of the foregoing.

What is claimed is:

1. In a method of drying egg whites, the steps which include subjecting the egg whites to the action of an added acidifying agent for a period of time sufficient to effect separation of a scum including the chalazae and stringy portions of the egg whites, and then removing said scum.

2. In a method of drying egg whites, the steps which include subjecting the egg whites to the action of a tartaric acid solution for a period of time sufficient to effect separation of a scum including the chalazae and stringy portions of the egg whites, and then removing said scum.

3. In a method of drying egg whites, the steps which include subjecting the egg whites to the action of a lactic acid solution for a period of time sufficient to effect separation of a scum including the chalazae and stringy portions of the egg whites, and then removing said scum.

4. In a method of drying egg whites, the steps which include subjecting the egg whites to the action of an edible water soluble acidifying agent for a period of time sufficient to effect separation of a scum including the chalazae and stringy portions of the egg whites, and then removing said scum.

5. In a method of drying egg whites including subjecting the egg whites to the action of a mixture of lactic and phosphoric acids to effect acidification of the egg whites and the separation of the chalazae and stringy portions from the other portions of the egg whites, removing the chalazae and stringy portions, and drying the remaining portions of the egg whites.

6. A method of drying egg whites including subjecting the egg whites to action of an added acidifying agent for a period of time to effect separation of the chalazae and stringy portions of the egg whites, removing the chalazae and stringy portions, and dehydrating the remaining portions of the egg whites.

7. A method of drying egg whites including subjecting egg whites to the action of tartaric acid solution to effect acidification of the egg whites and separation of the chalazae portions and stringy portions from the other portions of the egg whites, removing the chalazae and stringy portions, and dehydrating the remaining portions of the egg whites.

8. A method of drying egg whites including subjecting the egg whites to the action of a lactic acid solution to effect acidification of the egg whites and separation of the chalazae and stringy portions from the other portions of the egg whites, removing the chalazae and stringy portions and dehydrating the remaining portions of the egg whites.

9. The process of making dried egg albumen which comprises adding an edible soluble organic acid to the liquid albumen until a degree of acidity of approximately pH 6 is obtained, thereafter adding a soluble and non-toxic alkali to the mixture until a degree of alkalinity of pH 8.6 is obtained, and allowing the mixture to dry and crystallize.

10. The process of making dried egg albumen which comprises adding an edible soluble vegetable acid to the liquid albumen until a degree of acidity of approximately pH 6 is obtained, thereafter adding a soluble and non-toxic alkali to the mixture until a degree of alkalinity of pH 8.6 is obtained, and allowing the mixture to dry and crystallize.

11. The process of making dried egg albumen which comprises adding lactic acid to the liquid albumen until a degree of acidity of approximately pH 6 is obtained, thereafter adding a soluble and non-toxic alkali to the mixture until a degree of alkalinity of pH 8.6 is obtained, and allowing the mixture to dry and crystallize.

12. The process of making dried egg albumen which comprises adding an edible soluble organic acid to the liquid albumen until a degree of acidity of approximately pH 6 is obtained, thereafter adding ammonium hydroxide to the mixture until a degree of alkalinity of approximately pH 8.6 is obtained, and allowing the mixture to dry and crystallize.

13. The process of making dried egg albumen which comprises adding an edible soluble vegetable acid to the liquid albumen until a degree of acidity of approximately pH 6 is obtained, thereafter adding ammonium hydroxide to the mixture until a degree of alkalinity of approximately pH 8.6 is obtained, and allowing the mixture to dry and crystallize.

14. The process of making dried egg albumen which comprises adding lactic acid to the liquid albumen until a degree of acidity of approximately pH 6 is obtained, thereafter adding ammonium hydroxide to the mixture until a degree of alkalinity of approximately pH 8.6 is obtained, and allowing the mixture to dry and crystallize.

15. The process of preparing egg albumen for drying which comprises adding an edible soluble organic acid to the liquid albumen until a degree of acidity of approximately pH 6 is obtained, thereafter adding a soluble and non-toxic alkali to the liquid mixture until a degree of alkalinity of approximately pH 8.6 is obtained, and removing the scum from the surface of the mixture.

16. The process of preparing egg albumen for drying which comprises adding an edible soluble vegetable acid to the liquid albumen until a degree of acidity of approximately pH 6 is obtained, thereafter adding a soluble and non-toxic alkali to the liquid mixture until a degree of alkalinity of approximately pH 8.6 is obtained, and removing the scum from the surface of the mixture.

17. The process of preparing egg albumen for drying which comprises adding lactic acid to the liquid albumen until a degree of acidity of approximately pH 6 is obtained, thereafter adding a soluble and non-toxic alkali to the liquid mixture until a degree of alkalinity of approximately pH 8.6 is obtained, and removing the scum from the surface of the mixture.

18. The process of preparing egg albumen for drying which comprises adding an edible soluble organic acid to the liquid albumen until a degree of acidity of approximately pH 6 is obtained, thereafter adding ammonium hydroxide to the liquid mixture until a degree of alkalinity of approximately pH 8.6 is obtained, and removing the scum from the surface of the mixture.

19. The process of preparing egg albumen for drying which comprises adding an edible soluble vegetable acid to the liquid albumen until a degree of acidity of approximately pH 6 is obtained, thereafter adding ammonium hydroxide to the liquid mixture until a degree of alkalinity of approximately pH 8.6 is obtained, and removing the scum from the surface of the mixture.

20. The process of preparing egg albumen for drying which comprises adding lactic acid to the liquid albumen until a degree of acidity of approximately pH 6 is obtained, thereafter adding ammonium hydroxide to the liquid mixture, until a degree of alkalinity of approximately pH 8.6 is obtained, and removing the scum from the surface of the mixture.

HENRY I. ROSNER.